US011996732B2

(12) United States Patent
Jang et al.

(10) Patent No.: US 11,996,732 B2
(45) Date of Patent: May 28, 2024

(54) FAN MOTOR

(71) Applicant: LG Electronics Inc., Seoul (KR)

(72) Inventors: Kwangyong Jang, Seoul (KR);
Yongdae Kim, Seoul (KR); Cheol Han,
Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

(21) Appl. No.: 17/432,556

(22) PCT Filed: Mar. 27, 2019

(86) PCT No.: PCT/KR2019/003602
§ 371 (c)(1),
(2) Date: Aug. 20, 2021

(87) PCT Pub. No.: WO2020/171278
PCT Pub. Date: Aug. 27, 2020

(65) Prior Publication Data
US 2022/0149674 A1     May 12, 2022

(30) Foreign Application Priority Data

Feb. 20, 2019  (KR) .................. 10-2019-0020011

(51) Int. Cl.
*F04D 25/06*    (2006.01)
*H02K 1/16*     (2006.01)
(Continued)

(52) U.S. Cl.
CPC .............. *H02K 1/16* (2013.01); *F04D 25/06* (2013.01); *H02K 3/12* (2013.01); *H02K 7/003* (2013.01); *H02K 7/14* (2013.01); *H02K 2203/00* (2013.01)

(58) Field of Classification Search
CPC ........................... F04D 25/06; H02K 2203/12
See application file for complete search history.

(56) References Cited

U.S. PATENT DOCUMENTS

| 10,177,631 B1 | 1/2019 | Hopkins et al. | |
| 2004/0000837 A1* | 1/2004 | Suzuki | H02K 1/185 |
| | | | 310/216.074 |

(Continued)

FOREIGN PATENT DOCUMENTS

| DE | 102017207532 | 11/2018 |
| EP | 3160018 | 4/2017 |

(Continued)

OTHER PUBLICATIONS

KR Notice of Allowance in Korean Appln. No. 10-2019-0020011, dated Oct. 5, 2020, 12 pages (with English translation).

(Continued)

*Primary Examiner* — Thomas Fink
(74) *Attorney, Agent, or Firm* — Fish & Richardson P.C.

(57) ABSTRACT

A stator core of a fan motor comprises: a back yoke body; and a plurality of teeth which are spaced apart from each other inside the back yoke body, wherein each of the plurality of teeth comprises: a neck coupled to the back yoke body; and a shoe protruding from the neck and facing the outer circumference of a rotor, and each of a plurality of insulators of the fan motor comprises: a neck insulator surrounding the neck; a first barrier protruding from the neck insulator in an axial direction; and a pair of second barriers protruding from the neck insulator towards the inner circumference of the back yoke body.

8 Claims, 6 Drawing Sheets

(51) Int. Cl.
*H02K 3/12* (2006.01)
*H02K 7/00* (2006.01)
*H02K 7/14* (2006.01)

(56) References Cited

U.S. PATENT DOCUMENTS

| | | | |
|---|---|---|---|
| 2004/0150287 A1* | 8/2004 | Wainio | H02K 1/16 |
| | | | 310/216.004 |
| 2012/0080976 A1* | 4/2012 | Oka | H02K 3/522 |
| | | | 310/215 |
| 2016/0178265 A1 | 6/2016 | Lee | |
| 2017/0256995 A1 | 9/2017 | Lam et al. | |
| 2018/0160872 A1 | 6/2018 | Hayamitsu | |
| 2018/0177373 A1 | 6/2018 | Hayamitsu | |
| 2019/0082917 A1* | 3/2019 | Shiozawa | H02K 3/522 |
| 2019/0365167 A1 | 12/2019 | Jung et al. | |
| 2021/0156300 A1 | 5/2021 | Nau et al. | |

FOREIGN PATENT DOCUMENTS

| | | |
|---|---|---|
| GB | 2362268 | 11/2001 |
| JP | H10201160 | 7/1998 |
| JP | 4077687 | 4/2008 |
| JP | 2013158163 | 8/2013 |
| JP | 2015065790 | 4/2015 |
| JP | 6299930 | 3/2018 |
| JP | 2018139463 | 9/2018 |
| KR | 20110055278 | 5/2011 |
| WO | WO2016194255 | 12/2016 |
| WO | WO2018131988 | 7/2018 |

OTHER PUBLICATIONS

Extended European Search Report in European Appln. No. 19916287.6, dated Oct. 17, 2022, 48 pages.

Office Action in Australian Appln. No. 2019430538, dated Aug. 19, 2022, 8 pages.

* cited by examiner

[Fig. 1]
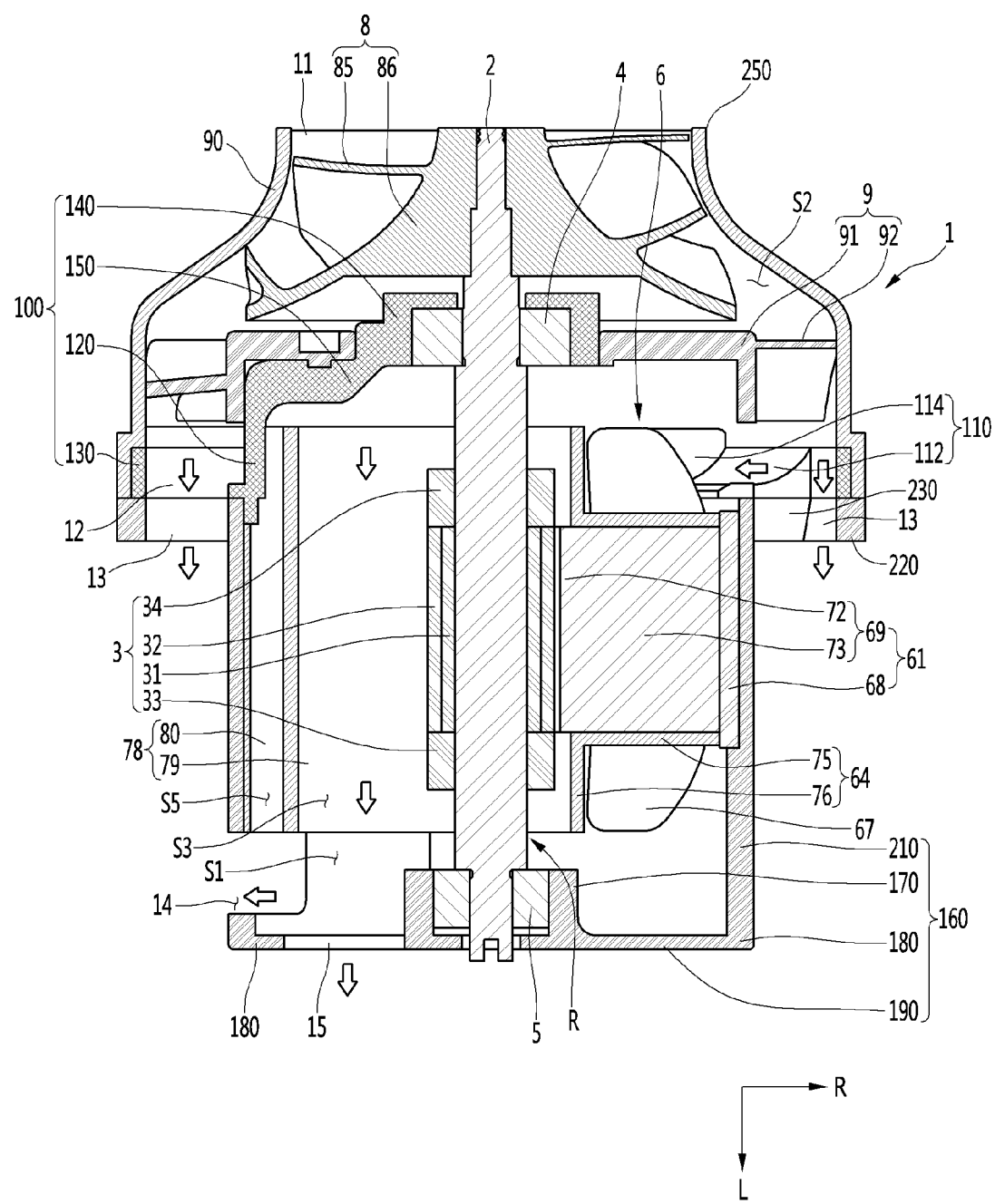

[Fig. 2]
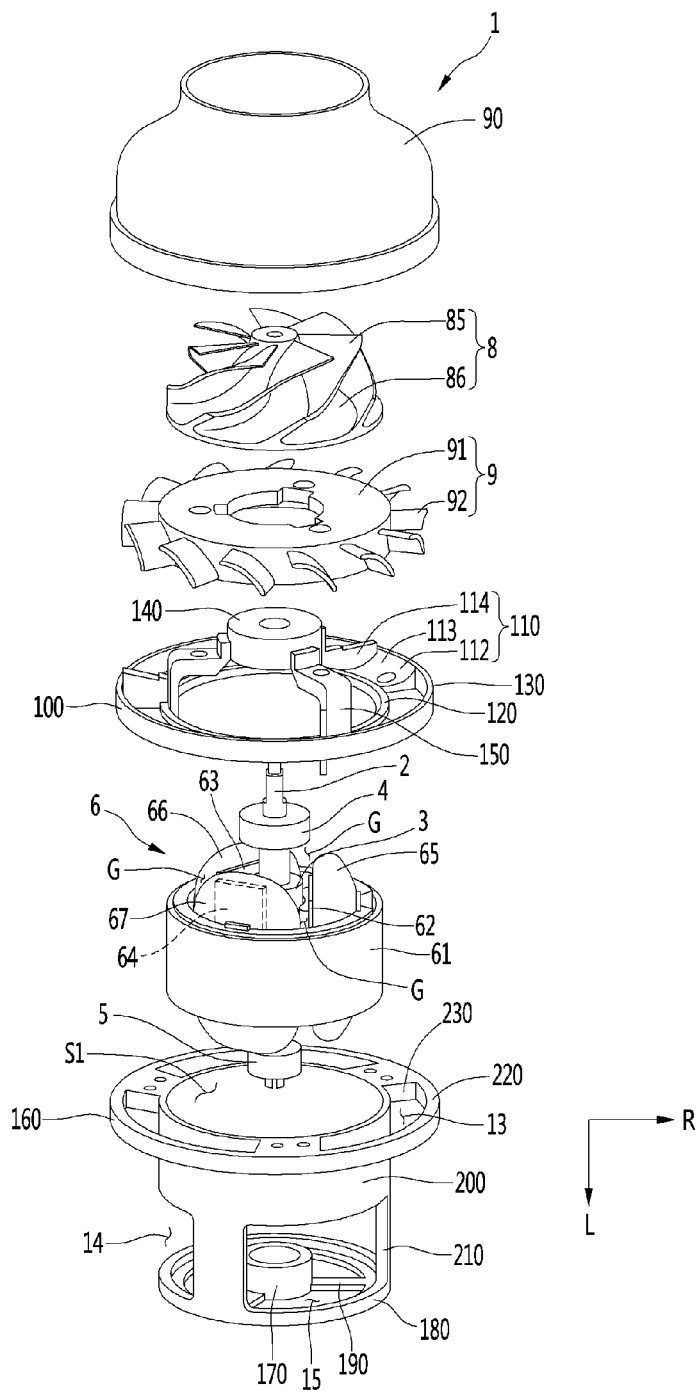

[Fig. 3]
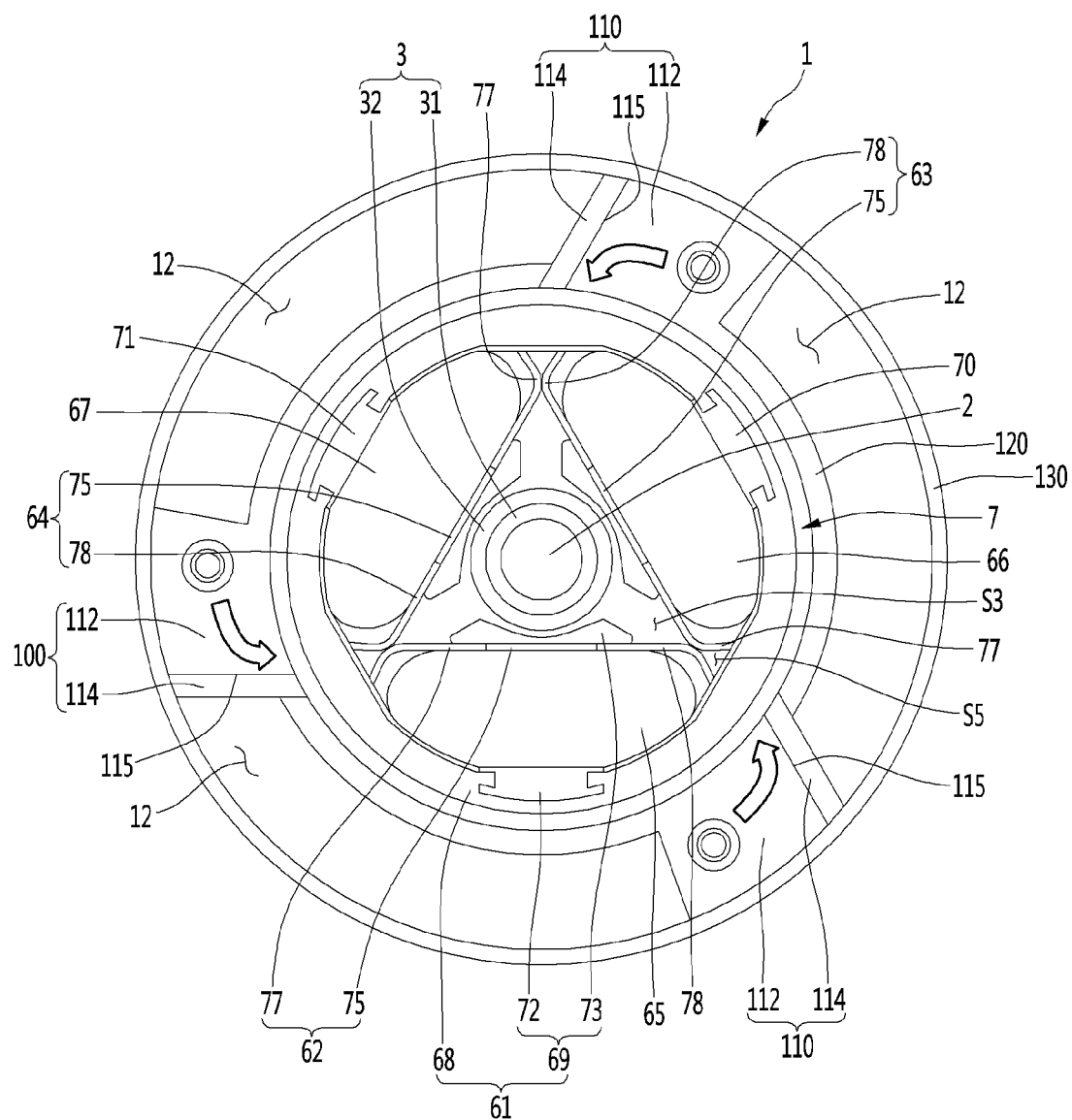

[Fig. 4]
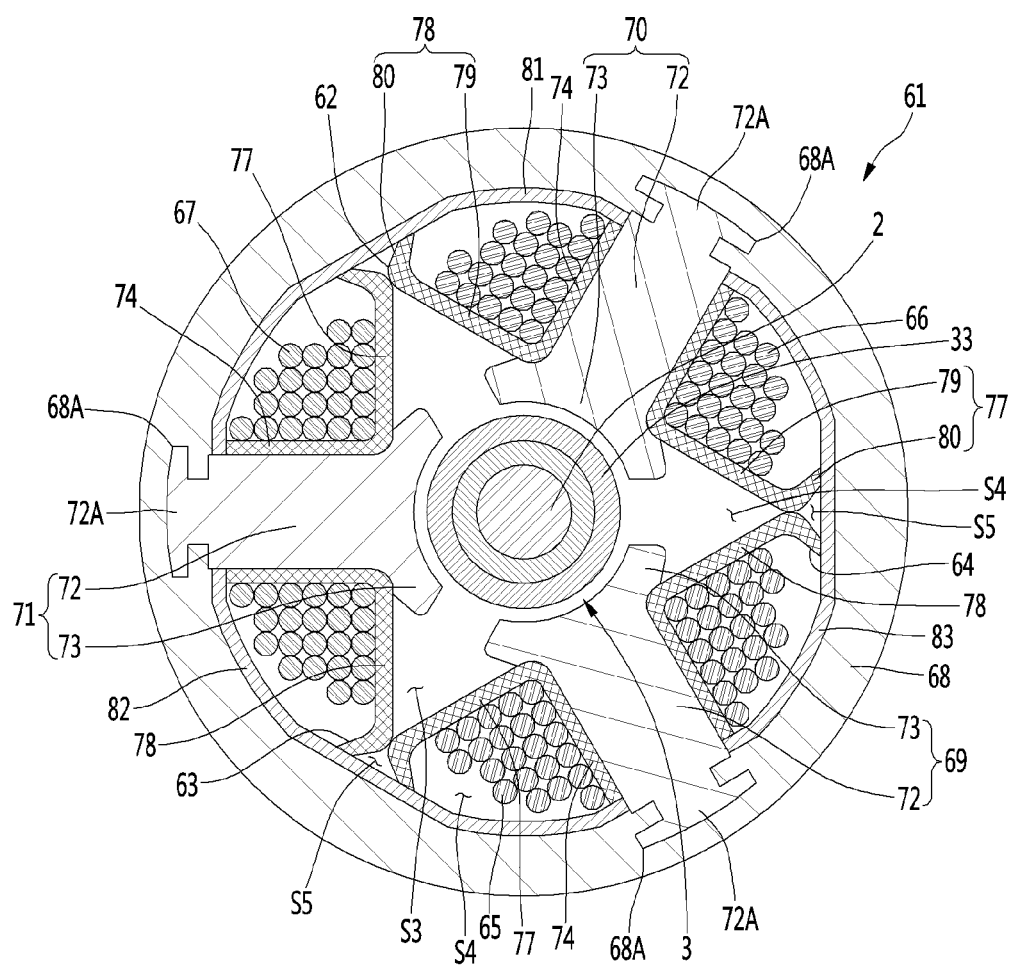

[Fig. 5]
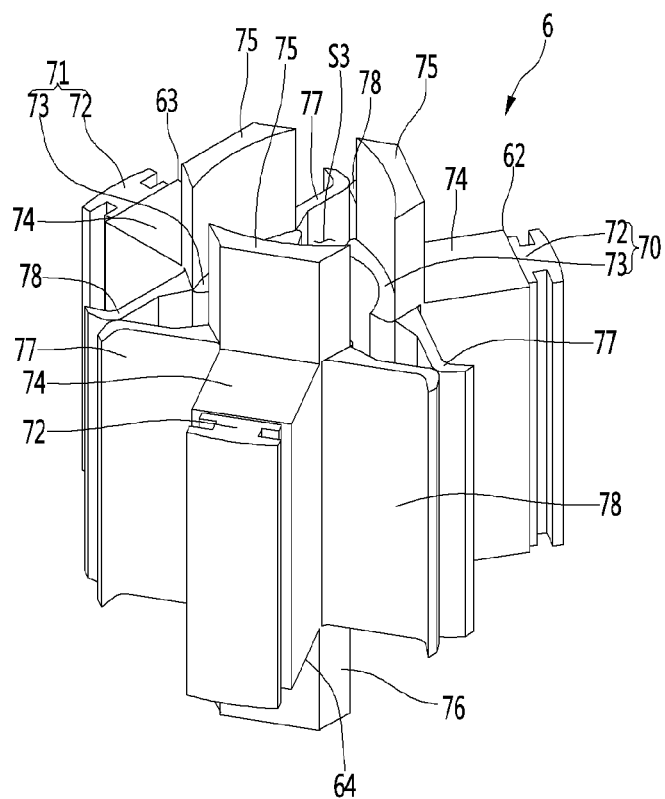
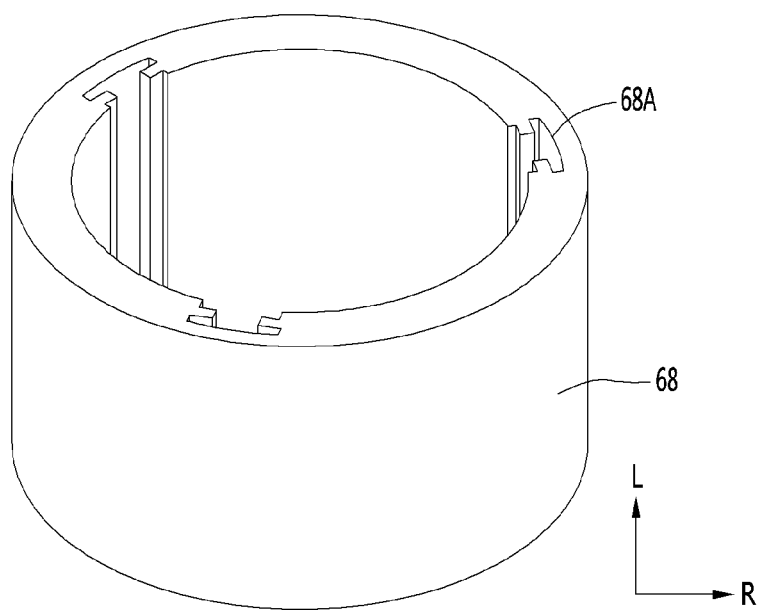

[Fig. 6]
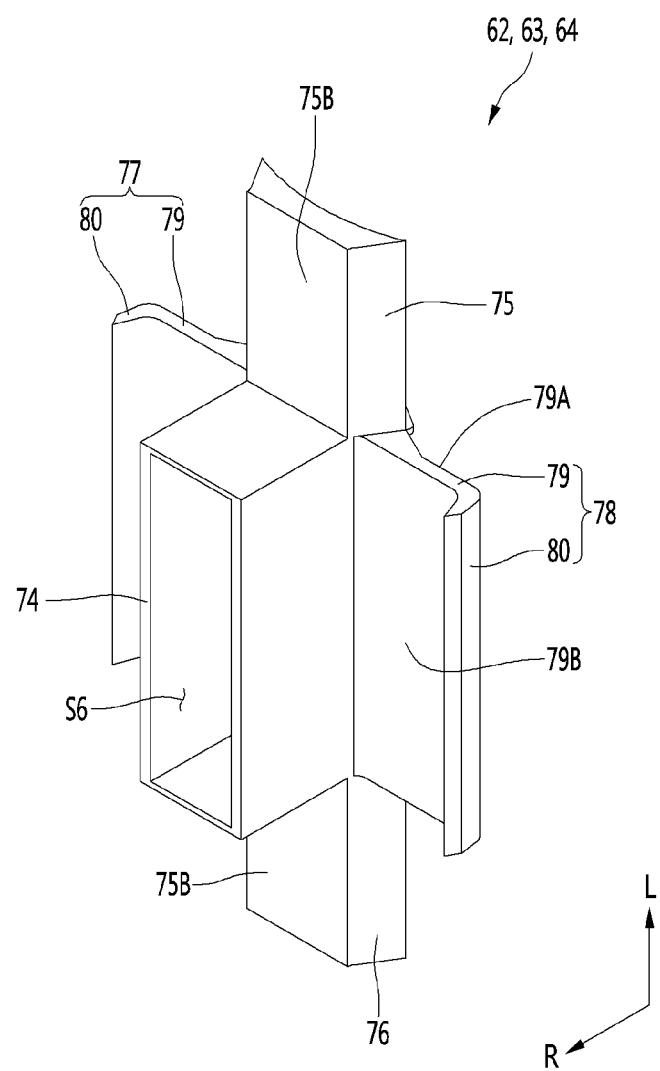

FAN MOTOR

CROSS-REFERENCE TO RELATED APPLICATIONS

This application is a National Stage Application under 35 U.S.C. § 371 of International Application No. PCT/KR2019/003602, filed on Mar. 27, 2019, which claims priority to Korean Patent Application No. 10-2019-0020011, filed Feb. 20, 2019. The disclosures of the prior application are incorporated by reference in their entirety.

TECHNICAL FIELD

The present disclosure relates to a fan motor, and more particularly, relates to a fan motor, an inner part of which is cooled by a flow formed by an impeller.

BACKGROUND ART

A fan motor is mounted in a vacuum cleaner or a hair dryer to generate an air flow.

When mounted in a home appliance such as the vacuum cleaner, the fan motor may generate suction force for suctioning air into a dust collector.

When mounted in a home appliance, such as the hair drier, blowing force may be generated to transmit air to the heater.

For example, such a fan motor may include a housing, a stator mounted in the housing, a rotor rotated by the stator, a rotating shaft on which the rotor is mounted, and an impeller mounted on the rotating shaft. The rotating shaft of the fan motor may be rotatably supported by at least one bearing, and may be rotated at a higher speed while being supported by the bearing.

When the internal temperature of the fan motor is increased, the performance of the fan motor may be deteriorated. Accordingly, preferably, the internal temperature of the fan motor is maintained without being heated.

DISCLOSURE

Technical Problem

The present disclosure is to provide a fan motor capable of maintaining higher reliability and of increasing a space factor.

The present disclosure is also to provide a fan motor capable of more rapidly radiating heat from a rotor with higher reliability, by forming a fluid passage around the rotor to intensively cool the rotor.

Technical Solution

According to an embodiment of the present disclosure, a fan motor includes a rotating shaft, a rotor mounted on the rotating shaft, a stator surrounding the rotor, and an impeller coupled to the rotation shaft, and the stator includes a stator core, a plurality of insulators coupled to the stator core, and a coil wound on each of the plurality of insulators.

The stator core may include a back yoke body. A plurality of teeth are integrally formed, and each of the plurality of teeth may be coupled to the back yoke body. The plurality of teeth may be disposed inside the back yoke body to be spaced apart from each other.

The tooth, the insulator, and the coil coupled to each other may be coupled to the back yoke body. When the tooth is integrally formed on the back yoke body, a work of winding the coil may be more easily performed.

Each of the plurality of teeth may include a neck coupled to the back yoke body, and a shoe protruding toward an outer circumference of the rotor from the neck. Each of the plurality of insulators may include a barrier to support the coil and to guide air to a peripheral portion of the rotor.

In this case, since the coil is supported by the barrier, the coil may be wound with the higher space factor, the air flowing by the impeller may be guided by the barrier to pass through the space between the rotor and the barrier, and may rapidly radiate heat from the rotor.

Each of the plurality of insulators may include a neck insulator surrounding the neck, a first barrier protruding in an axial direction from the neck insulator, and a pair of second barriers protruding toward an inner circumference of the back yoke body from the neck insulator.

The first barrier may support a portion (that is, an outer coil part), which is positioned outside the back yoke body, of the coil such that the portion of the coil is prevented from flowing down in a direction of facing the rotating shaft due to the weight of the coil or the vibration. The coil may be wound around the neck insulator such that the number of windings of the coil is maximized.

The second barrier may hold a portion, which is positioned inside the back yoke body, of the coil such that the portion of the coil is prevented from being away from the tooth coupled to the insulator having the second barrier. The coil may be wound around the neck insulator such that the number of windings is maximized.

A plurality of assemblies, which are formed as the insulators are coupled to the teeth, may surround the outer circumference of the rotor. The plurality of assemblies may surround the outer circumference of the rotor while partitioning the outer circumference of the rotor. In addition, a cooling fluid passage may be formed among the plurality of assemblies and the rotor to be open in the axial direction and closed in a radial direction.

The back yoke body may be provided therein with the cooling fluid passage surrounded by the plurality of assemblies and a plurality of outer fluid passages divided into each other between the insulator and an inner circumference of the back yoke body. The air flowing by the impeller may mainly pass through the cooling fluid passage while intensively cooling the rotor, especially, the magnet.

Each of the plurality of insulators may include a pair of first barriers. The pair of first barriers may protrude in opposite directions. The coil may have a pair of outer coil parts when wound around the neck insulator. A pair of coil end turning parts may be supported by the pair of first barriers with higher reliability.

The pair of second barriers may protrude in opposite directions from the neck insulator. Each of the pair of second barriers may make contact with second barriers of adjacent different insulators.

Each of the pair of second barriers may include an air guide which makes contact with a second barrier of an adjacent different insulator to form a cooling fluid passage together with the adjacent different insulator.

The fan motor may further include an inner insulator disposed on the inner circumference of the back yoke body. A coil space may be formed among the second barrier, the neck insulator, and the inner insulator to receive the coil. A portion (that is, the inner coil part), which is positioned inside the back yoke body, of the coil may be received in the coil space.

The inner insulator may be disposed between the adjacent teeth.

One surface of the air guide may face the second barrier of an adjacent different insulator, a shoe, and a rotor. The one surface of the air guide may guide the air such that the air passes through the space between the rotor and the air guide.

In addition, an opposite surface of the air guide may face the inner insulator. The opposite surface of the air guide may make contact with the inner coil part of the coil, and may support the coil such that the inner coil part is prevented from flowing down toward the rotor.

Each of the pair of second barriers may include an inner insulator contactor extending from the air guide to make contact with the inner insulator. The inner insulator contactor may hold the coil such that the coil is prevented from flowing down between the air guide and the inner insulator, and the inner coil unit may be supported with the higher reliably.

The inner insulator, the neck insulator, and the second barrier may be sealed while surrounding the outer circumference of the inner coil part, and the inner coil part may be maintained with the higher reliability.

Advantageous Effects

According to an embodiment of the present disclosure, since the coil is supported by the barrier, the coil may be wound around the insulator with the higher space factor, and the air flowing by the impeller may rapidly radiate heat from the rotor while passing through the space between the rotor and the barrier.

In addition, since the first barrier may support the outer coil part, and the second barrier may support the inner coil part, both the outer coil part and the inner coil part may be supported with higher reliability. Accordingly, the coil may be wound around the insulator with the higher space factor, and the fan motor may ensure the higher output even in a smaller size.

In addition, since the air guide constituting the second barrier has the function of guiding the air and the function of supporting the coil, the number of parts may be minimized, and the fan motor may be realized in a smaller size.

DESCRIPTION OF DRAWINGS

FIG. 1 is a longitudinal-sectional surface of a fan motor according to an embodiment of the present disclosure;

FIG. 2 is an exploded perspective view of a fan motor according to an embodiment of the present disclosure;

FIG. 3 is a plan view illustrating an internal structure of a fan motor according to an embodiment of the present disclosure;

FIG. 4 is a cross-sectional view of a fan motor according to an embodiment of the present disclosure;

FIG. 5 is a perspective view of a fan motor when a plurality of teeth and a plurality of insulators are separated from a back yoke body according to an embodiment of the present disclosure; and FIG. 6 is a perspective view illustrating an insulator according to an embodiment of the present disclosure.

BEST MODE

Mode for Invention

Hereinafter, an embodiment of the present disclosure will be described with reference to accompanying drawings.

FIG. 1 is a longitudinal-sectional surface of a fan motor according to an embodiment of the present disclosure, FIG. 2 is an exploded perspective view of a fan motor according to an embodiment of the present disclosure, and FIG. 3 is a plan view illustrating an internal structure of a fan motor according to an embodiment of the present disclosure.

According to the present embodiment, a fan motor may include a motor body 1, a rotating shaft 2, a rotor 3 mounted on the rotating shaft 2, a stator 6 surrounding the rotor 3, and an impeller 8 coupled to the rotating shaft 2.

The motor body 1 may form an outer appearance of the fan motor. The motor body 1 may include an air suction port 11 to suction external air into an inner part of the motor body 1 and air discharge ports 12, 13, 14, and 15 to discharge air, which passes through the inner part of the motor body 1, out of the motor body 1.

The motor body 1 may include an assembly of a plurality of members. The motor body 1 may include an impeller cover 90, an inner bracket 100, and a motor housing 160.

The rotating shaft 2, which is rotated together with the rotor 3, may longitudinally extend inside the motor body 1. The rotating shaft 2 may longitudinally extend to an inner part of the impeller cover 90 from an inner part of the motor housing 160.

The rotating shaft 2 may be supported by bearings 4 and 5 and may be rotatably disposed inside the motor body 1. The rotating shaft 2 supported by the bearings 4 and 5 may be rotated by the rotor 3.

The rotating shaft 2 may have an impeller connection part to couple an impeller 8 thereto. The impeller connection part may be formed at a position spaced apart from a rotor mounting part, on which the rotor 3 is mounted, of the rotating shaft 2. The impeller connecting part may be formed at one end portion of the rotating shaft.

The rotating shaft 2 may include bearing mounting parts to mount the bearings 4 and 5 thereto.

The rotor 3 may be formed in a cylindrical hollow shape. The rotor 3 may be mounted on the rotating shaft 2 to surround a portion of the rotating shaft 2. The rotor 3 may be rotatably positioned inside the stator 6.

The rotor 3 may be mounted on the rotating shaft 2 to partially surround the rotating shaft 2 between opposite ends of the rotating shaft 2.

The rotor 3 may include a magnet 32, and a pair of end plates 33 and 34 to fix the magnet 32.

The magnet 32 may be an ND magnet. The magnet 32 may face an inner circumference of the stator 6 in a radial direction R.

The rotor 3 may further include a rotor core 31 fixed to the rotating shaft 2. When the rotor 3 further includes the rotor core 31, the magnet 32 may be disposed at an outer circumference of the rotor core 31, and may form an outer circumference of the rotor 3. When the rotor 3 has no the rotor core 31, the magnet 32 may be directly fixed to an outer circumference surface of the rotating shaft 2.

The bearings 4 and 5 may receive and support the motor body 1, and may rotatably support the rotating shaft 2 in the state that the bearings 4 and 5 are coupled to the rotating shaft 2.

The bearings 4 and 5 may be a rolling bearing such as a ball bearing, a roller bearing, and a needle bearing, or a gas bearing.

When the bearings 4 and 5 are rolling bearings, the rolling bearings may include an inner ring fixed to the rotating shaft, an outer ring fixed to the motor body 1, and a rolling member interposed between the inner ring and the outer ring.

When the bearings 4 and 5 are gas bearings, the gas bearing may be supported by the motor body 1 to have an air gap with respect to the rotating shaft 2.

The fan motor may include the plurality of bearings 4 and 5.

A plurality of bearings 4 and 5 may be spaced apart from each other while interposing the rotor 3 therebetween. In this case, any one 4 of the plurality of bearings 4 and 5 may be mounted on the rotating shaft 2 to be interposed between the impeller 8 and the rotor 3. The remaining one 5 of the plurality of bearings 4 and 5 may be mounted on a portion, which is opposite to the impeller 8, of the rotating shaft 2. The rotor 3 may be positioned between the plurality of bearings 4 and 5.

The plurality of bearings 4 and 5 may be mounted on the rotating shaft 2 to be interposed between the impeller 8 and the rotor 3. In this case, the plurality of bearings 4 and 5 may be mounted on the rotating shaft 2 to be spaced apart from each other in an axial direction L.

The following description will be made while focusing on an example that the plurality of bearings 4 and 5 are spaced apart from each other while interposing the rotor 3 therebetween, a bearing between the impeller 8 and the rotor 3 will be referred to as a first bearing 4, and a bearing positioned in opposition to the impeller 8 will be referred to as a second bearing 5. Meanwhile, common components of the first bearing 4 and the second bearing 5 will be referred to the bearings 4 and 5 for the convenience of explanation.

The inner ring of the first bearing 4 may be fixed between the impeller 8 and the rotor 3 of the rotating shaft 2, and the outer ring of the first bearing 4 is the motor body 1, in particular, It may be fixed to the bearing housing 140 of the inner bracket 100.

The inner ring of the second bearing 5 may be fixed to a portion, which is opposite to the impeller 8, of the rotating shaft 2, and the outer ring of the second bearing 5 may be fixed to the motor body 1, especially, a hollow body 170 of the motor housing 160.

The load and the vibration of the rotating shaft 2 and the impeller 8 are split through the first bearing 4 and the second bearing 5 and transmitted to the motor body 1.

The stator 6 may be disposed inside the motor body 1. The stator 6 may be mounted in the motor body 1 to rotate the rotor 3. The stator 6 may be disposed inside the motor housing 160. The stator 6 may be mounted in the motor body 1. In particular, the stator 6 may be mounted in the motor housing 160 through a fastening member such as a screw. The stator 6 may be formed in a hollow cylindrical shape substantially. The stator 6 may be mounted on an inner circumference of the motor housing 160 to surround the outer circumference of the rotor 3.

The stator 6 may include an assembly of a plurality of members.

The stator 6 may include a stator core 61, an insulator, and a coil.

The insulator may be coupled to the stator core 61, and the stator 6 may include a plurality of insulators 62, 63, and 64 as illustrated in FIGS. 2 and 3. The plurality of insulators 62, 63, and 64 may be coupled to the stator core 61.

The coil may be wound on the insulator, and the stator 6 may include a plurality of coils 65, 66, and 67, as illustrated in FIGS. 2 and 3. The coils may be wound around the plurality of insulators 62, 63, and 64, respectively.

The insulator and the coil may correspond to each other 1:1, and the stator 6 may include a stator core 61, the plurality of insulators 62, 63, 64, and the plurality of coils 65, 66, and 67.

The stator core 61 may include a back yoke body 68 and a plurality of teeth 69, 70, and 71 disposed inside the back yoke body 68, as illustrated in FIG. 3. The plurality of teeth 69, 70, and 71 may be spaced apart from each other. One end of each of the plurality of teeth 69, 70, and 71 may be supported by the back yoke body 68, and an opposite end of each of the plurality of teeth 69, 70, and 71 may face an outer circumference of the rotor 3.

The plurality of teeth 69, 70, and 71 may be arranged at equal distances in a circumferential direction.

The tooth, the insulator, and the coil may correspond to one another 1:1:1.

When the fan motor is a two-pole three-phase motor, the stator 63 may include one back yoke body 68, three teeth 69, 70, and 71, three insulators 62, 63, and 64, and three coils 65, 66, and 67.

When each of the plurality of coils 65, 66, and 67 is wound around the insulator, the each coil may include an inner coil part positioned inside the back yoke body 68, and a pair of outer coil parts positioned outside the back yoke body 68.

The plurality of coils 65, 66, and 67 may be spaced apart from each other along the outer circumference of the rotor 3, and a gap G (see FIG. 2) may be formed between adjacent coils such that air passes through the gap. The gap G may be formed to be open in a radial direction between the outer coil parts of the adjacent coils. When the fan motor is a two-pole three-phase motor, the total of three gaps G may be formed. The three gaps G may function as passages to introduce air, which flows by the impeller 9, into a cooling fluid passage S3 (see FIG. 1 and FIG. 4) to be described below.

The impeller 8 may be coupled to the rotating shaft 2. The impeller 8 may be rotated inside the motor body, especially, the impeller cover 90 when the rotating shaft 2 rotates.

The impeller 8 may include a plurality of blades 85 and a hub 86 from which the plurality of blades 85 protrude.

The plurality of blades 85 may be formed to protrude from a surface, which faces the air suction port 11, of opposite surfaces of the hub 86.

The motor may further include a diffuser 9 positioned inside the motor body 1. The diffuser 9 may be positioned after the impeller 8 in a direction in which air flows. The diffuser 9 may be disposed to be positioned inside the impeller cover 90 or inside the motor housing 160. The diffuser 9 may be coupled to at least one the impeller cover 90, the inner bracket 100, or the motor housing 160.

The diffuser 9 may include a body part 91 and a diffuser vane 92 that converts dynamic pressure of the air passing through the impeller 8 into static pressure.

The body part 91 may be larger in size than the air suction port 11 and smaller in size than the impeller cover 90.

The body part 91 may have a rotating shaft through hole through which the rotating shaft 2 rotatably passes. The body part 91 may be disposed to surround the outer circumference of the rotating shaft 2, between the rotating shaft 2 and the motor body 1.

The diffuser vane 92 may protrude from the outer circumference of the body part 91.

An inner part of the motor body 1 may be partitioned into a motor space S1, in which the rotor 3 and the stator 6 are positioned, and an impeller space S2 in which the impeller 8 is rotatably received. The motor space S1 and the impeller space S2 may be partitioned by the diffuser 9.

The air suction port 11 may be formed in the impeller cover 90. The impeller space S2 may be formed inside the impeller cover 90.

The inner bracket 100 may guide the air flowing by the impeller 8 to the space between the rotor 3 and the stator 6. The inner bracket 100 may include a flowing guide 110 to guide the air flowing by the impeller 8 to spaces among the plurality of coils 65, 66, and 67. The flowing guide 111 may intensively guide the air flowing by the impeller 8 to the rotor 3. The flowing guide 110 may guide the air flowing by the impeller 8 toward the rotor 3 after passing through the gaps G among the plurality of coils 65, 66, and 67.

The fan motor may have a larger flow resistance and may not rapidly discharge air, when the entire portion of the air flowing by the impeller 8 is guided to the rotor 3 and the stator 6. The fan motor may be configured such that a portion of the air flowing by the impeller 8 is discharged out of the fan motor, instead of being guided to the rotor 3 and the stator 6. To this end, the inner bracket 100 may have the air discharge port 12 (see FIGS. 1 and 3) allowing the air to pass therethrough such that the air is discharged out of the motor body 1. The air discharge port 12 formed in the inner bracket 100 may be an inner discharge port positioned inside the fan motor.

The inner bracket 100 may include an inner guide 120, and an outer guide 130 spaced apart from the inner guide 120, to form the flowing guide 110 and the air discharge port 12 in the inner bracket 100.

Each of the inner guide 120 and the outer guide 130 may be formed in a ring shape. The outer diameter of the inner guide 120 may be smaller than the inner diameter of the outer guide 130. The outer guide 130 may be formed to be positioned outside the inner guide 120. The outer guide 130 may be disposed to surround an outer circumference of the inner guide 120. The inner guide 120 and the outer guide 130 may be formed to have a concentric axis.

The flowing guide 110 may be coupled to each of the inner guide 120 and the outer guide 130, and may be formed to connect the outer circumference of the inner guide 120 to the inner circumference of the outer guide 130. The flowing guide 110 may be a guide bridge to connect the inner guide 120 to the outer guide 130.

When the fan motor is a two-pole three-phase motor, flowing guides 110 may correspond to the coils 65, 66, and 67 1:1. A plurality of the flowing guides 110 may be formed in the inner bracket 100.

The plurality of flowing guides 110 may be formed to be spaced apart from each other in the circumferential direction. The air discharge port 12 through which air may pass may be formed between the plurality of flowing guides 110. The air discharge port 12 may be formed among the inner guide 120, the outer guide 130, and the flowing guide 110.

A portion of each of the plurality of coils 65, 66, and 67 may be located inside the inner guide 120. A portion, which is positioned inside the inner guide 120, of each of the coils 65, 66, and 67 may face the inner guide 120 in the radial direction R.

The flowing guide 110 may include a first guide 112 and a second guide 114.

The first guide 112 may be formed to connect the inner guide 120 to the outer guide 130. The air flowing by the impeller 8 may flow into the inner bracket 100 while turning three-dimensionally. A portion of the air may flow in the axial direction L while passing through the air discharge port 12. A remaining portion of the air is guided by the first guide 112 to flow while turning in the circumferential direction and the radial direction R such that the air is guided to the second guide 114.

In the first guide 112, one surface 113 to guide the air may be curved surface. The first guide 112 may have thicknesses varied in the radial direction, and may have a thickness which is gradually thicker outward. The one surface 113 of the first guide 112 may be gently curved toward the inner guide 120 and may be sharply curved toward the outer guide 130. The first guide 112 may guide the air flowing while turning such that the air is guided to the second guide 114 while being gathered toward the inside the fan motor.

The second guide 114 may be uprightly provided on the first guide 112. The second guide 114 may face each of the plurality of coils 65, 66, and 67 or the gap G between adjacent coils. The air guided by the first guide 112 may be switched to a guiding direction of one surface 115 of the second guide 114 guides, after colliding with the one surface 115 of the second guide 114.

The inner bracket 100 may include the bearings 4 and 5, especially, the bearing housing 140 to support the first bearing 4, and the inner bridge 150 to connect the bearing housing 140 to the inner guide 120.

The bearing housing 140 may be spaced apart from each of the inner guide 120 and the outer guide 130, as illustrated in FIGS. 1 and 2. The outer diameter of the bearing housing 140 may be smaller than the inner diameter of the inner guide 120, and the inner bridge 150 may be formed to connect the inner guide 110 to the bearing housing 140. One end of the inner bridge 150 may be coupled to the inner guide 110, and an opposite end of the inner bridge 150 may be coupled to the bearing housing 140.

The inner bracket 100 may include a plurality of inner bridges 150, and the plurality of inner bridges 150 may be spaced apart from each other in the circumferential direction of the inner bracket 100.

The motor housing 160 may include the hollow body 170, an outer ring 180, and a plurality of outer bridges 190.

The hollow body 170 may be formed in a hollow cylindrical shape, and may face the rotor 3 in the axial direction L. The hollow body 170 may support the bearings 4 and 5, especially, the second bearing 5.

The outer ring 180 may be larger than the hollow body 170. The inner diameter of the outer ring 180 may be greater than the outer diameter of the hollow body 170, and the outer ring 180 may be positioned outside the hollow body 170. The outer ring 180 and the hollow body 170 may be spaced apart from each other in the radial direction R.

The plurality of outer bridges 190 may connect the hollow body 170 to the outer ring 180.

The plurality of outer bridges 190 may be spaced apart from each other in the circumferential direction, and the air discharge port 15 through which air be discharged out of the fan motor may be formed between the adjacent outer bridges 190. This air discharge port 15 may be open in the axial direction L, and hereinafter, may be referred to as an axial-direction air discharge port 15 to distinguish from other air discharge ports 12, 13, and 14.

Air may be discharged out of the fan motor through the axial-direction air discharge port 15 after cooling the rotor 3 inside the motor housing 160.

The motor housing 160 may surround the outer circumference of the stator 6 and may protect the stator 6.

The motor housing 160 may further include a stator housing 200 and a plurality of connecting bodies 210.

The stator housing 200 may have an inner circumferential surface facing the outer circumferential surface of the stator 6. The stator housing 200 may be a body to which the stator 6 is fastened, and may be a body substantially surrounding the outer circumference of the stator 6, especially, the back yoke body 68.

The plurality of connecting bodies 210 may connect the stator housing 200 to the outer ring 180. One end of each of the plurality of connecting bodies 210 may be connected to the stator housing 200, and an opposite of each of the plurality of connecting bodies 210 may be connected to the outer ring 180.

The plurality of connecting bodies 210 may be spaced apart from each other in the circumferential direction, and the air discharge port 14 through which air is discharged out of the fan motor may be formed between the adjacent connecting bodies 210. The air discharge port 14 may be open in the radial direction R, and hereinafter, may be referred to a radial-direction air discharge port 14 to distinguish from other air discharge ports 14.

A portion of the air may be discharged out of the fan motor through the radial-direction air discharge port 14, after cooling the rotor 3 and the stator 6 inside the motor housing 160.

When the axial-direction air discharge port 15 and the radial-direction air discharge part 14 are formed together in the motor housing 160, the air cooling the rotor 3 and the stator 6 inside the motor housing 160 may be rapidly discharged out of the fan motor.

Meanwhile, the motor housing 160 may further include an outer body 220 larger than the stator housing 200. The motor housing 160 may include a plurality of housing bridges 230 to connect the stator housing 200 to the outer body 220

The inner diameter of the outer body 220 may be larger than the outer diameter of the stator housing 200. The outer body 220 may be positioned outside the stator housing 200. The stator housing 200 and the outer body 220 may have a concentric axis, and the outer body 220 may surround a portion of the outer circumference of an inner body 220.

The outer body 220 may be spaced apart from the stator housing 200 in the radial direction R, outside the inner body 220.

The plurality of housing bridges 230 may be formed to be spaced apart from each other in a circumferential direction, and the air discharge port 13 through which air is discharged may be formed between the adjacent housing bridges 230.

The motor housing 160 may include the air discharge port 13 (hereinafter, referred to as an "outer discharge port 13) formed to communicate with the air discharge port 12 formed in the inner bracket 100, and the outer discharge port 13 may be formed among the stator housing 200, the outer body 220, and the housing bridge 230.

The housing bridge 230 may correspond to the flowing guide 110 1:1, and may cover the flowing guide 110 to minimize the flowing guide 110 viewed from the outside.

The inner guide 120 of the inner bracket 100 may be connected to the stator housing 200. In addition, the outer guide 130 of the inner bracket 100 may be spaced apart from the inner guide 120 of the inner bracket 100 and may be connected to the outer body 200.

A portion of the air flowing by the impeller 8 may sequentially pass through the air discharge port 12 of the inner bracket 100 and the outer discharge port 13 of the motor housing 160 and then may be discharged out of the outer circumference of the stator housing 200. The air may be rapidly discharged out of the fan motor without directly making contact with the rotor 3 and the stator 6.

FIG. 4 is a cross-sectional view of a fan motor according to an embodiment of the present disclosure, FIG. 5 is a perspective view of a fan motor when a plurality of teeth and a plurality of insulators are separated from a back yoke body according to an embodiment of the present disclosure, and FIG. 6 is a perspective view illustrating an insulator according to an embodiment of the present disclosure.

Each of the plurality of teeth 69, 70, and 71 may include a neck 72 and a shoe 73.

The neck 72 may be coupled to the back yoke body 68.

The shoe 73 may protrude from the neck 74 and may face the outer circumference of the rotor 3.

Each of the plurality of insulators 62, 63, and 64 may include a neck insulator 74, first barriers 75 and 76, and second barriers 77 and 78.

The neck insulator 74 may be formed to surround the neck 72.

The neck 72 may be formed in a substantially hexahedral shape, and the neck insulator 74 may be formed in a hollow rectangular cylindrical shape including four walls for surrounding the neck 72.

The neck insulator 74 may be formed therein with a neck receiving space S6 in which the neck 72 is inserted and received. The neck receiving space S6 may be open in the radial direction R.

At least one of the first barriers 75 and 76 may be formed on the neck insulator 74. The first barriers 75 and 76 may protrude in the axial direction L from the neck insulator 74.

Each of the plurality of insulators 62, 63, and 64 may include a pair of first barriers 75 and 76.

The pair of first barriers 75 and 76 may protrude in opposite directions.

The coils 65, 66, and 67 may include an inner coil part and a pair of outer coil parts. Any one of the pair of outer coil parts may be supported by any one 75 of the pair of first barriers 75 and 76, and another one of the pair of outer coil parts may be supported by another one 76 of the pair of first barriers 75 and 76.

The second barriers 77 and 78 may protrude from the neck insulator 74 in a direction different from that of the first barriers 75 and 76. The second barriers 77 and 78 may protrude in a direction substantially perpendicular to the first barriers 75 and 76.

The pair of the second barriers 77 and 78 may be formed on the neck insulator 74, and each of the pair of second barriers 77 and 78 may protrude toward the inner circumference of the back yoke body 68 from the neck insulator 74.

The fan motor may include a plurality of assemblies formed by coupling the insulator to the teeth as illustrated in FIG. 5. The plurality of assemblies may surround the outer circumference of the rotor 3 as illustrated in FIG. 4, when coupled to the back yoke body 68.

A cooling fluid passage S3 may be formed among the plurality of assemblies and the rotor 3 to be open in the axial direction and closed in the radial direction. The sectional shape of the cooling fluid passage S3 may be substantially a triangular shape. The cooling fluid passage S3 may be formed among the pair of second barriers 77 and 78, the shoe 73, and the rotor 3.

The pair of second barriers 77 and 78 may protrude from the neck insulator 74 in opposite directions.

Each of the pair of second barriers 77 and 78 may make contact with the second barriers of different insulators adjacent to the pair of second barriers 77 and 78.

When the fan motor includes the first, second, and third insulators 62, 63, and 64, referring to FIG. 4, any one 78 of a pair of second barriers 77 and 78 constituting the first insulator 62 may make contact with one 77 of the pair of second barriers 77 and 78 constituting the second insulator 63. In addition, a remaining one 77 of a pair of second barriers 77 and 78 constituting the first insulator 62 may make contact with one 78 of the pair of second barriers 77 and 78 constituting the third insulator 64. [139] Each of the pair of second barriers 77 and 78 may include an air guide 79 to form the cooling fluid passage S3. The air guide 79 may make contact with a second barrier of a different insulator adjacent thereto to form the cooling fluid passage S3 together with the adjacent different insulator.

The fan motor may further include an inner insulator disposed on the inner circumference of the back yoke body 68. The inner insulator may be disposed between the adjacent teeth. Inner insulators may correspond to the teeth 1:1, and the fan motor may include a plurality of inner insulators 81, 82, and 83. A coil space S4, in which a coil is received, may be formed among the second barriers 77 and 78 and the inner insulators 81, 82 and 83.

One surface 79A of the air guide 79 may face the second barrier of an adjacent different insulator, the shoe 73, and the rotor 3.

an opposite surface 79B of the air guide 79 may face the inner insulator.

each of the pair of second barriers 77 and 78 includes an inner insulator contactor 80 extending from the air guide 79 to make contact with the inner insulators 81, 82, and 83.

A stator cooling fluid passage S5 separated from the cooling fluid passage S3 may be formed between a pair of adjacent inner insulator contactors 80 and the inner insulator. The stator cooling fluid passage S5 may be separated from the cooling fluid passage S3, and may be provided in parallel to the cooling fluid passage S3.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

The invention claimed is:

1. A fan motor comprising:
a rotating shaft;
a rotor mounted on the rotating shaft;
a stator surrounding the rotor; and
an impeller coupled to the rotation shaft,
wherein the stator includes:
　a stator core;
　a plurality of insulators coupled to the stator core; and
　a coil wound on each of the plurality of insulators,
wherein the stator core includes:
　a back yoke body; and
　a plurality of teeth disposed inside the back yoke body to be spaced apart from each other,
wherein each of the plurality of teeth includes:
　a neck coupled to the back yoke body; and
　a shoe protruding toward an outer circumference of the rotor from the neck, and
wherein each of the plurality of insulators includes:
　a neck insulator surrounding the neck;
　a first barrier protruding in an axial direction from the neck insulator; and
　a pair of second barriers protruding toward an inner circumference of the back yoke body from the neck insulator,
wherein the pair of second barriers protrude in opposite directions from the neck insulator,
wherein the pair of second barriers each comprises:
　an air guide that is in contact with a second barrier of an adjacent different insulator and defines a cooling fluid passage together with the adjacent different insulator,
wherein the stator further comprises:
　an inner insulator disposed on an inner circumference of the back yoke body,
wherein a coil space is defined among the second barrier, the neck insulator, and the inner insulator and configured to receive the coils,
wherein the pair of second barriers each includes an inner insulator contactor extending from the air guide and contacting the inner insulator,
wherein a stator cooling fluid passage is defined between the inner insulator contactor of the adjacent different insulator and the inner insulator, and
wherein the stator cooling fluid passage is separated from the cooling fluid passage and the coil space.

2. The fan motor of claim 1, wherein a plurality of assemblies, which are formed as the insulators are coupled to the teeth, surround the outer circumference of the rotor, and
wherein the cooling fluid passage is formed among the plurality of assemblies and the rotor to be open in the axial direction and closed in a radial direction.

3. The fan motor of claim 1, wherein each of the plurality of insulators includes a pair of first barriers, and
wherein the pair of first barriers protrude in opposite directions.

4. The fan motor of claim 1, wherein the inner insulator is disposed between the teeth adjacent to each other.

5. The fan motor of claim 1, wherein one surface of the air guide faces the second barrier of the adjacent different insulator, the shoe, and the rotor, and
wherein an opposite surface of the air guide faces the inner insulator.

6. A fan motor comprising:
a rotating shaft;
a rotor mounted on the rotating shaft;
a stator surrounding the rotor; and
an impeller coupled to the rotation shaft,
wherein the stator includes:
　a stator core;
　a plurality of insulators coupled to the stator core; and
　a coil wound on each of the plurality of insulators,
wherein the stator core includes:
　a back yoke body; and
　a plurality of teeth disposed inside the back yoke body to be spaced apart from each other,
wherein each of the plurality of teeth includes:
　a neck coupled to the back yoke body; and
　a shoe protruding toward an outer circumference of the rotor from the neck,
wherein each of the plurality of insulators comprises:
　a neck insulator surrounding the neck;
　a first barrier protruding in an axial direction from the neck insulator; and
　a pair of second barriers protruding toward an inner circumference of the back yoke body from the neck insulator, wherein the pair of second barriers protrude in opposite directions from the neck insulator, wherein the pair of second barriers each comprises an air guide that is in contact with a second barrier of an adjacent different insulator and defines a cooling fluid passage together with the adjacent different insulator, wherein the fan motor further comprising an inner insulator disposed on an inner circumference of the back yoke body, wherein a coil space is defined among the second barrier, the neck insulator, and the inner insulator to receive the coil, wherein the pair of second barriers each comprises an inner insulator contactor extending from the air guide and contacting the inner insulator, wherein a stator cooling fluid passage is defined between the inner insulator contactor of the adjacent different insulator and the inner insulator, and wherein the stator cooling fluid passage is separated from the cooling fluid passage and the coil space.

7. The fan motor of claim 6, wherein the inner insulator is disposed between the teeth adjacent to each other.

8. The fan motor of claim 6, wherein one surface of the air guide faces the second barrier of the adjacent different insulator, the shoe, and the rotor, and wherein an opposite surface of the air guide faces the inner insulator.

\* \* \* \* \*